United States Patent
Beall et al.

(10) Patent No.: US 7,807,250 B2
(45) Date of Patent: Oct. 5, 2010

(54) WALL-FLOW HONEYCOMB FILTER WITH HEXAGONAL CHANNEL SYMMETRY

(75) Inventors: Douglas Munroe Beall, Painted Post, NY (US); Kenneth Richard Miller, Addison, NY (US)

(73) Assignee: Corning Incorporated, Corning, NY (US)

( * ) Notice: Subject to any disclaimer, the term of this patent is extended or adjusted under 35 U.S.C. 154(b) by 132 days.

(21) Appl. No.: 11/998,314

(22) Filed: Nov. 29, 2007

(65) Prior Publication Data

US 2008/0124517 A1    May 29, 2008

Related U.S. Application Data

(60) Provisional application No. 60/861,586, filed on Nov. 29, 2006.

(51) Int. Cl.
*B32B 3/12*    (2006.01)
(52) U.S. Cl. .......................... 428/116; 428/118
(58) Field of Classification Search ................ 428/116, 428/117, 118, 119; 502/527.16
See application file for complete search history.

(56) References Cited

U.S. PATENT DOCUMENTS

| 3,790,654 | A |   | 2/1974  | Bagley ................ 264/177 |
| 3,826,603 | A |   | 7/1974  | Wiley ................. 425/461 |
| 3,853,485 | A |   | 12/1974 | Hogan ................ 23/288 F |
| 4,042,738 | A | * | 8/1977  | Gulati ................ 428/116 |
| 4,381,815 | A |   | 5/1983  | Frost et al. .............. 165/10 |
| 4,455,336 | A |   | 6/1984  | Ogawa et al. ............ 428/116 |
| 4,810,554 | A |   | 3/1989  | Hattori et al. ............ 428/116 |
| 5,108,685 | A |   | 4/1992  | Kragle ................ 264/177.12 |
| 6,673,414 | B2 |   | 1/2004  | Ketcham et al. .......... 428/116 |
| 6,710,014 | B2 |   | 3/2004  | Domeslee et al. .......... 502/439 |
| 2004/0266619 | A1 |   | 12/2004 | Bernas et al. .......... 502/527.21 |
| 2005/0076627 | A1 | * | 4/2005  | Itou et al. .............. 55/523 |

FOREIGN PATENT DOCUMENTS

JP    55-147154    1/1980
WO    2007/134898    11/2007

* cited by examiner

*Primary Examiner*—Gordon R Baldwin
(74) *Attorney, Agent, or Firm*—Matthew B. McNutt

(57) ABSTRACT

A wall-flow honeycomb filter has a monolith body which includes repeating hexagonal unit cells, wherein each hexagonal unit cell has inner cells and outer cells arranged in a hexagonal symmetry, and wherein the inner cells are bordered by the outer cells and the outer cells are of diamond shape.

9 Claims, 5 Drawing Sheets

WALL-FLOW HONEYCOMB FILTER WITH HEXAGONAL CHANNEL SYMMETRY

RELATED APPLICATIONS

This application claims the benefit of U.S. Provisional Application No. 60/861,586, filed Nov. 29, 2006. entitled "Wall-Flow Honeycomb Filter with Hexagonal Channel Symmetry."

BACKGROUND

The invention relates generally to wall-flow honeycomb filters and extrusion dies for making the same. More specifically, the invention relates to a wall-flow honeycomb filter having a hexagonal channel symmetry and an extrusion die for making the same.

Wall-flow honeycomb filters are used in diesel exhaust systems to remove soot and ash from diesel exhaust. The conventional wall-flow honeycomb filter consists of a ceramic monolith body having longitudinal, parallel channels defined by porous walls. The channels are alternately end-plugged to form a checkered pattern of plugs at the end faces of the monolith body. The channels having their ends plugged at the inlet end face of the monolith body may be referred to as outlet channels, and the channels having their ends plugged at an outlet end face of the monolith body may be referred to as inlet channels. The cross-section of the inlet and outlet channels is typically square because square cells are easier to manufacture and lend themselves to a regular pattern of alternating inlet and outlet channels having equal cross-sectional areas for low pressure drop.

Diesel exhaust enters the wall-flow honeycomb filter through the inlet channels, flows through the porous walls into the outlet channels, and exits through the outlet channels, with the porous walls retaining a portion of the soot and ash in the exhaust. As soot and ash accumulate on the porous walls, the effective flow area of the inlet channels decreases. The decreased effective flow area creates a pressure drop across the honeycomb filter, which exerts a back pressure against the diesel engine. To maintain the back pressure exerted against the diesel engine at an acceptable limit, thermal regeneration is used to remove the soot trapped in the honeycomb filter. During thermal regeneration, the filter can experience high thermal gradients, which can lead to higher thermal stresses that can crack the filter. It is thus desirable that the honeycomb filter has a cell structure that is resistant to cracking during thermal regeneration.

The honeycomb filter is typically wrapped in a mat and inserted in a metal can prior to use in an exhaust system. When the honeycomb filter is inserted in a can, the forces required to restrain the honeycomb filter within the can are uniformly distributed along the periphery of the monolith body, perpendicular to the skin of the monolith body. These forces have the greatest impact for the honeycomb filter with square cells when applied at 45° positions to the square cells, that is, in a direction along the diagonals of the square cells. When loaded at this angle, the walls defining the square cells cannot function as columns under compression, and the honeycomb filter is less rigid. In this state, the walls are subjected to high deflections, which generate bending moments and undesirable tensile stresses in the honeycomb filter.

From the foregoing, it would be an advancement in the art to have a wall-flow honeycomb filter having a more compliant cell structure than the conventional square cell structure. Desirably, the honeycomb filter having the more compliant cell structure would be able to maintain a low pressure drop during use in an exhaust system.

SUMMARY

In one aspect, the invention relates to a wall-flow honeycomb filter which comprises a monolith body. The monolith body comprises repeating hexagonal unit cells. Each hexagonal unit cell has inner cells and outer cells arranged in a hexagonal symmetry, wherein the inner cells are bordered by the outer cells and the outer cells have a diamond shape.

In another aspect, the invention relates to an extrusion die assembly for making a wall-flow honeycomb filter. The extrusion die assembly comprises a cell-forming die having a central region comprising an array of discharge slots cut to define repeating hexagonal pin units. Each hexagonal pin unit has inner pins and outer pins arranged in a hexagonal symmetry, wherein the inner pins are bordered by the outer pins and the outer pins have a diamond shape. The cell-forming die further includes an array of central feedholes in communication with the array of discharge slots.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, which encompasses other equally effective embodiments. The figures are not necessarily to scale, and certain features and certain view of the figures may be shown exaggerated in scale or in schematic in the interest of clarity and conciseness.

DETAILED DESCRIPTION

Figure 1:
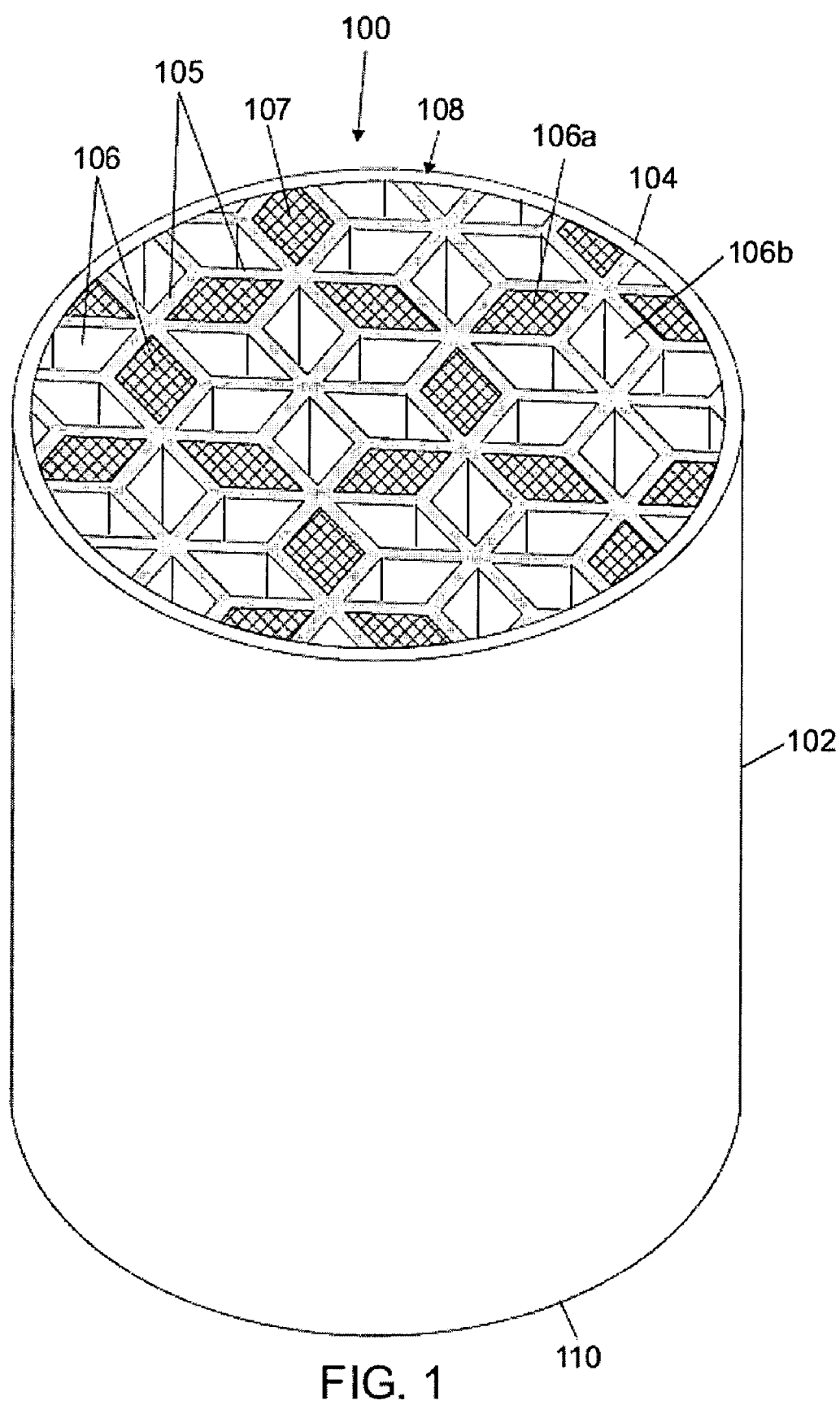
FIG. 1 is a perspective view of a wall-flow honeycomb filter having hexagonal channel symmetry.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 depicts a wall-flow honeycomb filter 100 having a hexagonal channel symmetry. The wall-flow honeycomb filter 100 includes a monolith body 102 whose cross-sectional shape is defined by a skin 104. The profile of the skin 104 is typically circular or elliptical, but the invention is not limited to any particular skin profile. Porous walls 105 define longitudinal, generally parallel channels 106 within the monolith body 102. A portion of the channels 106 are inlet channels 106a, which are end-plugged with filler material 107 at the outlet end face 108 of the honeycomb filter 100. A portion of the channels 106 are outlet channels 106b, which are end-plugged with filler material at the inlet end face 110 of the honeycomb filter 100. The inlet channels 106a are unplugged at the inlet end face 110, and the outlet channels 106b are unplugged at the outlet end face 108.

The monolith body 102 may be made of a ceramic material, such as cordierite or silicon carbide, or other suitable materials that can withstand high temperatures, such as those needed for filter thermal regeneration in an exhaust system. The filler material 107 used in end-plugging the channels 106 may also be made of a ceramic material or other materials that can withstand high temperatures, such as those needed for filter thermal regeneration in an exhaust system. The porosity of the porous walls 105 should be selected such that filtration is achieved without compromising the structural integrity of the monolith body 102. For diesel exhaust filtration, the porous walls 105 may incorporate pores having mean diameters in the range of 1 to 60 μm, typically in a range from 10 to 50 μm. The honeycomb filter 100 may have a cell density between approximately 10 and 300 cells/in$^2$ (1.5 and 46.5 cells/cm$^2$), typically between 100 and 200 cells/in$^2$ (15.5 and 31 cells/cm$^2$). The thickness of the porous walls 105 may range from approximately 0.002 in. to 0.060 in. (0.05 mm to 1.5 mm).

Figure 2A:
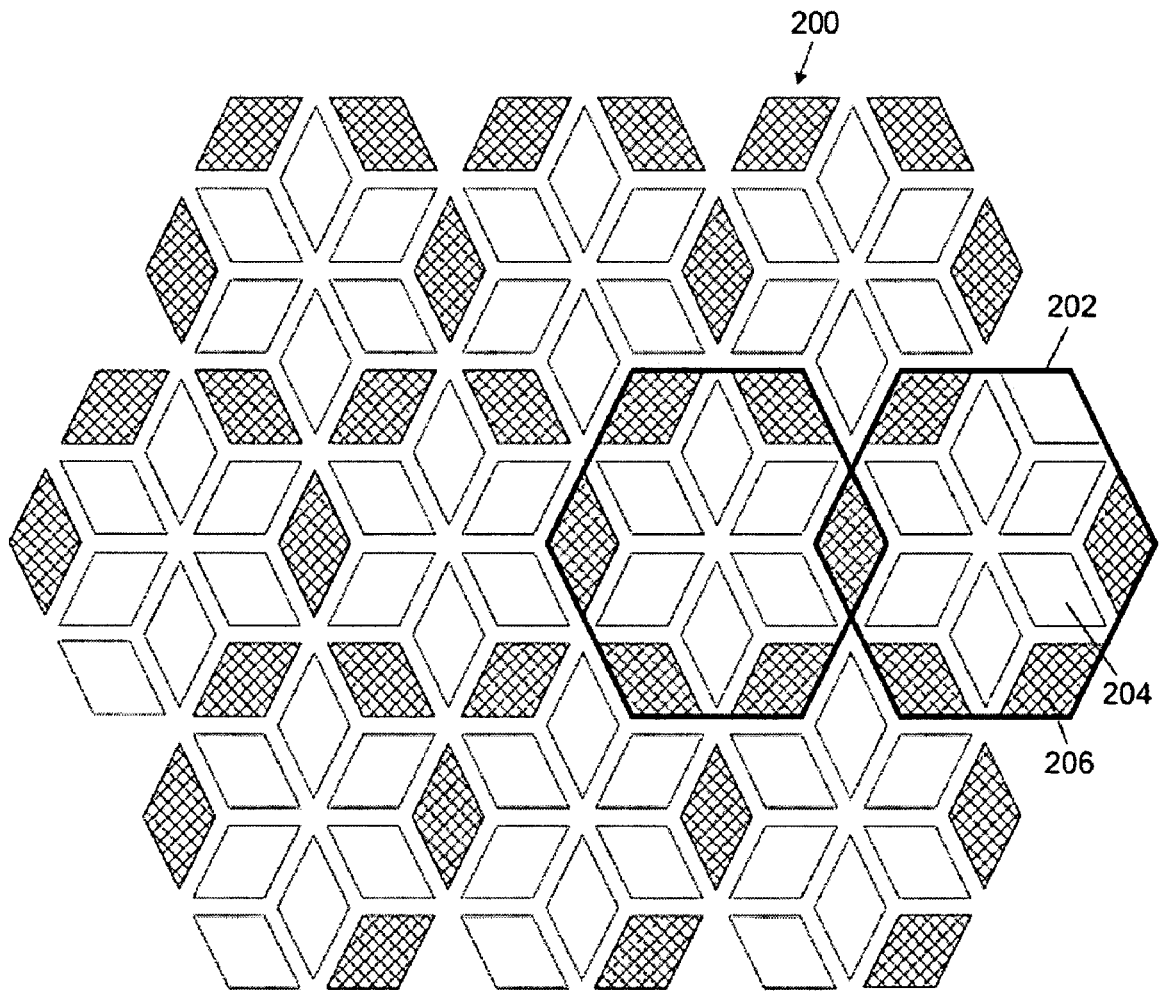
FIG. 2A is a close-up view of the cell structure of the wall-flow honeycomb filter of FIG. 1.
Figure 2B:
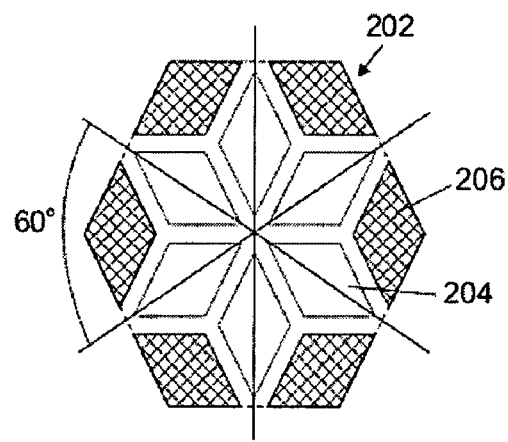
FIG. 2B is a hexagonal unit cell of the cell structure of FIG. 2A.

FIG. 2A shows a close-up view of the cell structure 200 of the wall-flow honeycomb filter having a hexagonal channel symmetry (100 in FIG. 1). The cell structure includes repeating hexagonal unit cells 202. FIG. 2B depicts a hexagonal unit cell 202. The unit cell 202 has a hexagonal symmetry. This means that the unit cell 202 is symmetric about a six-fold axis and that if the unit cell 202 is rotated 60° about its center the new orientation of the unit cell 202 would look identical to the original orientation. The unit cell 202 has an array of inner cells 204 bordered by an array of outer cells 206. The terms "inner cells" and "outer cells" are only used to express the proximity of the cells to the center of the unit cell 202. The inner cells 204 are thus closer to the center of the unit cell 202 than the outer cells 206.

The inner cells 204 have a diamond shape, with the longer diagonal of the diamond shape radially oriented with respect to the center of the unit cell 202. The outer cells 206 have a diamond shape, with the shorter diagonal of the diamond shape radially oriented with respect to the center of the unit cell 202. Each outer cell 206 shares a wall with one of the inner cells 204. When unit cells 202 are repeated in a cell structure 200 as shown in FIG. 2A, the outer cells 206 are shared between adjacent unit cells 202. In the cell structure 200, the ratio of the combined cross-sectional area of the inner cells 204 to the combined cross-sectional area of the outer cells 206 is approximately 2:1 In one example, the inner cells 204 form the outlet channels (106b in FIG. 1) of the honeycomb filter and the outer cells 206 form the inlet channels (106a in FIG. 1) of the honeycomb filter.

Figure 3A:
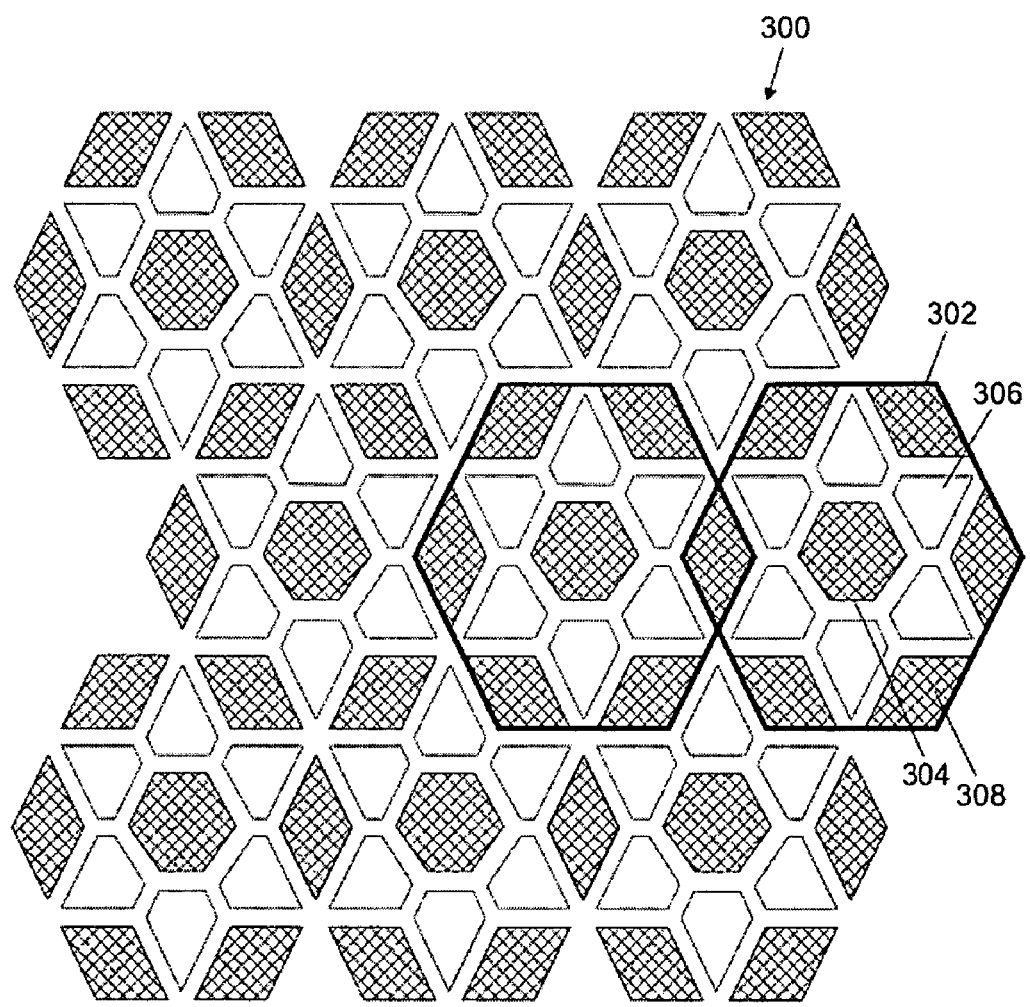
FIG. 3A is an alternate cell structure for the wall-flow honeycomb filter of FIG. 1.
Figure 3B:
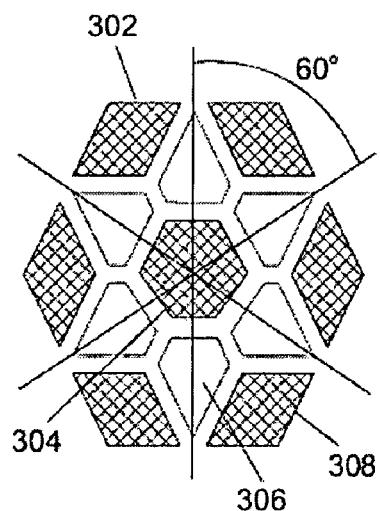
FIG. 3B is a hexagonal unit cell of the cell structure of FIG. 3A.

FIG. 3A shows a close-up view of an alternate cell structure 300 for the wall-flow honeycomb filter having a hexagonal channel symmetry (100 in FIG. 1). The cell structure 300 includes repeating hexagonal unit cells 302. FIG. 3B depicts a hexagonal unit cell 302. The unit cell 302 has a hexagonal symmetry. This means that the unit cell 302 is symmetric about a six-fold axis and that if the unit cell 302 is rotated 60° about its center the new orientation of the unit cell 302 would look identical to the original orientation. At the center of the unit cell 302 is a cell 304 having a hexagon shape. The cell 304 may be referred to as the center cell. The center cell 304 is bordered on all sides by inner cells 306. The inner cells 304 have a partial-diamond shape to accommodate the center cell 304. In other words, the inner cells 306 have a non-square polygonal shape.

Figure 3C:
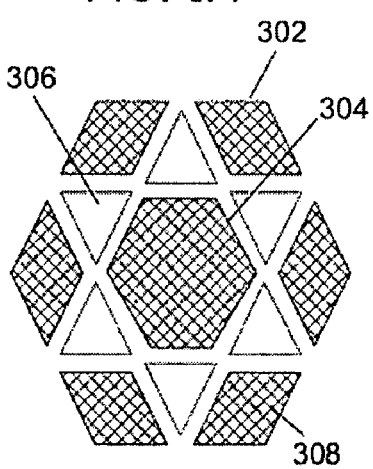
FIG. 3C is a special case of the hexagonal unit cell of FIG. 3B.
Figure 3D:
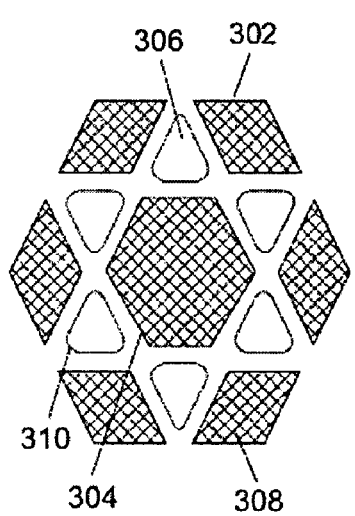
FIG. 3D shows the hexagonal unit cell of FIG. 3C with filleted cells.

In FIG. 3B, the non-square polygonal shape is a pentagon. If the center cell 304 is made large enough such that the corners of the hexagonal cell 304 meets the corners of the inner cells 306, the inner cells 306 would have a triangular shape as shown in FIG. 3C. The inner cells 306 are bordered by outer cells 308. The outer cells 308 of the unit cell 302 have a diamond shape, with the shorter diagonal of the diamond shape radially oriented with respect to the center of the unit cell 302. Each outer cell 308 shares a wall with one of the inner cells 306. When unit cells 302 are repeated in a cell structure 300 as shown in FIG. 3A, the outer cells 308 are shared between adjacent unit cells 302.

The size of the center cell 304 can be selected such that the ratio of the combined cross-sectional area of the inner cells 306 to the combined cross-sectional area of the outer and center cells 308, 304 is in a range from below 2:1 to as small as 1:2, typically in a range from 1:1 to 1:2. In one example, the inner cells 306 form the outlet channels (106b in FIG. 1) of the honeycomb filter and the center and outer cells 304, 308 form the inlet channels (106a in FIG. 1) of the honeycomb filter. For any of the cell structures described above, it is possible to include fillets or bevels in the corners of the cells. This is illustrated, for example, in FIG. 3C, where fillets 310 are added to the corners of the inner cells 306 of the unit cell 302. The fillets may improve the structural strength of the honeycomb filter.

Table 1 describes an example of a 200/11.6 wall-flow honeycomb filter having a hexagonal channel symmetry as shown in FIG. 3B, where the center cell has a hexagon shape, the inner cells have a partial-diamond shape, and the outer cells have a diamond shape. The thickness of the cell walls is 11.6 mil (0.29 mm) to achieve a cell density of 200 cells/in$^2$ (31 cells/cm$^2$) and an inlet to outlet channel cross-sectional area of 1:1. For comparison purposes, the parameters of a standard 200/12 wall-flow honeycomb filter having square cells with a cell wall thickness of 12 mil (0.30 mm), cell density of 200 cells/in$^2$ (31 cells/cm$^2$), and an inlet to outlet channel cross-sectional area of 1:1 is also shown in Table 1.

TABLE 1

|  | Hexagonal symmetry | Square geometry |
|---|---|---|
| Unit cell area (in$^2$) | 0.04988 |  |
| Area of partial-diamond cells (in$^2$) | 0.00288 |  |
| Total area of partial-diamond cells (in$^2$) | 0.01728 |  |
| Area of diamond cells (in$^2$) | 0.00384 |  |
| Total area of diamond cells (in$^2$) | 0.01152 |  |
| Area of hexagon cell (in$^2$) | 0.00576 |  |
| Total area of diamond and hexagon cells (in$^2$) | 0.01728 |  |
| Open frontal area (in$^2$) | 68.9 | 68.9 |
| Filtration area (in/in$^2$) | 21.69 | 23.48427 |
| Inlet channel area (in$^2$) | 0.004 (diamond cell) 0.006 (hexagon cell) | 0.003 |
| Hydraulic Diameter, 4A/P, (in) | 0.057 (diamond cell) 0.006 (hexagon cell) | 0.059 |

From Table 1, there is a small reduction in filtration area with the wall-flow honeycomb filter having a hexagonal symmetry in comparison to the wall-flow honeycomb filter having square cells. This reduction in filtration area would be expected to result in a pressure drop disadvantage. However, the hexagonal cells in the wall-flow honeycomb filter having a hexagonal symmetry can be made larger to increase the inlet filtration area, thereby achieving a lower pressure drop in comparison to the cell structure based on square cells. One of the advantages of the hexagonal symmetry design is that the inlet channel area is larger for the individual channels than in the case of the square channels in the 200/12 standard design. This is at least partially due to the fact that there are fewer inlet channels in the hexagonal symmetry design, but the inlet channels that are available are larger. In comparison to the square geometry, the diamond inlet channels provide a 10% increase in channel area while the hexagonal channels provide a 65% increase in channel area. It can also be seen in Table 1 that the diamond channels have a similar hydraulic diameter to the square channels while the hexagonal channels have a substantially larger hydraulic diameter. The larger inlet channels are expected to provide a benefit in soot and ash-loaded pressure drop.

Figure 4A:
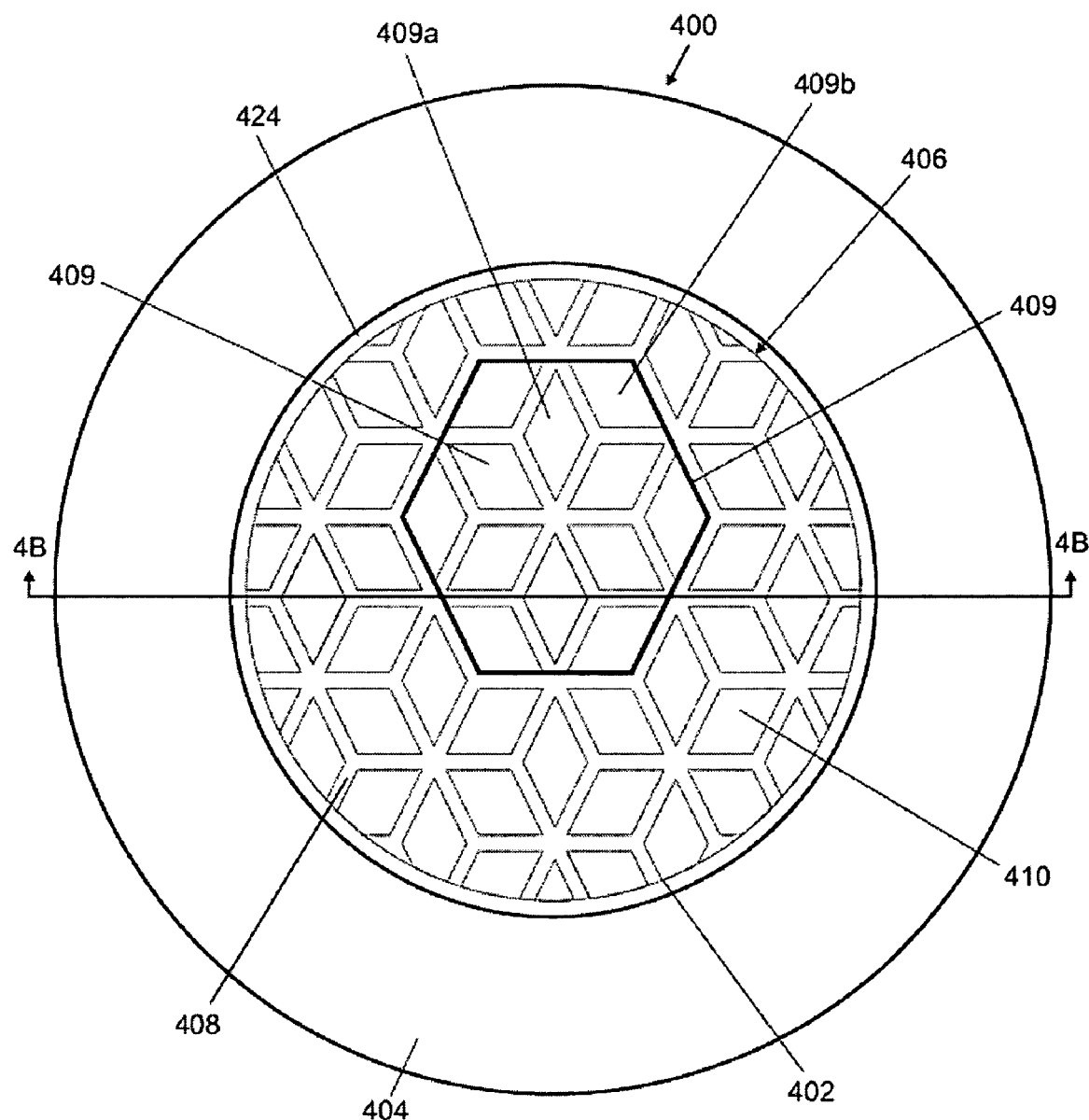
FIG. 4A is a top view of an extrusion die assembly for making a wall-flow honeycomb filter having a hexagonal channel symmetry.

The wall-flow honeycomb filter of the invention can be made using suitable processes such as extrusion. Honeycomb extrusion dies suitable for the manufacture of the wall-flow honeycomb filter of the invention would have pins arranged in a hexagonal symmetry. The corners of the pins may or may not be rounded. For illustration purposes, FIG. 4A shows a top view of an extrusion die assembly 400 suitable for making a wall-flow honeycomb filter having a hexagonal channel symmetry. The extrusion die assembly 400 includes a cell-forming die 402 and a skin-forming mask 404. The cell-forming die 402 is used to form the walls that define the channels of the honeycomb filter. The cell-forming die 402 cooperates with the skin-forming mask 404 to define the shape and thickness of the skin of the honeycomb filter.

The cell-forming die 402 has a central region 406 in which an array of discharge slots 408 are cut to define repeating hexagonal pin units 409. In the example shown in FIG. 4A, the pin unit 409 has a structure similar to the cell unit 202 (FIG. 2B). For example, the pin unit 409 has inner pins 409a bordered by outer pins 409b, where the inner pins 409a and 409b are arranged in a hexagonal symmetry. In general, the pin unit 409 may assume any of the structures described in FIGS. 2B, 3B, 3C, and 3D, and the repeating pattern of the pin units 409 may resemble any of the cell structures shown in FIGS. 2A and 3A. For example, for a pin structure similar to the cell structure shown in FIG. 3B, the pin unit 409 may have a center pin having a hexagon shape bordered by inner pins having a partial-diamond shape and outer pins having a diamond shape. In general, the description of the geometry of the cell units 202, 302 in FIGS. 2B, 3B, 3C, 3D above apply to the pin unit 409. Also, the corners of the pins in the pin unit may include fillets or bevels to allow for forming of cells having filleted or beveled corners.

Figure 4B:
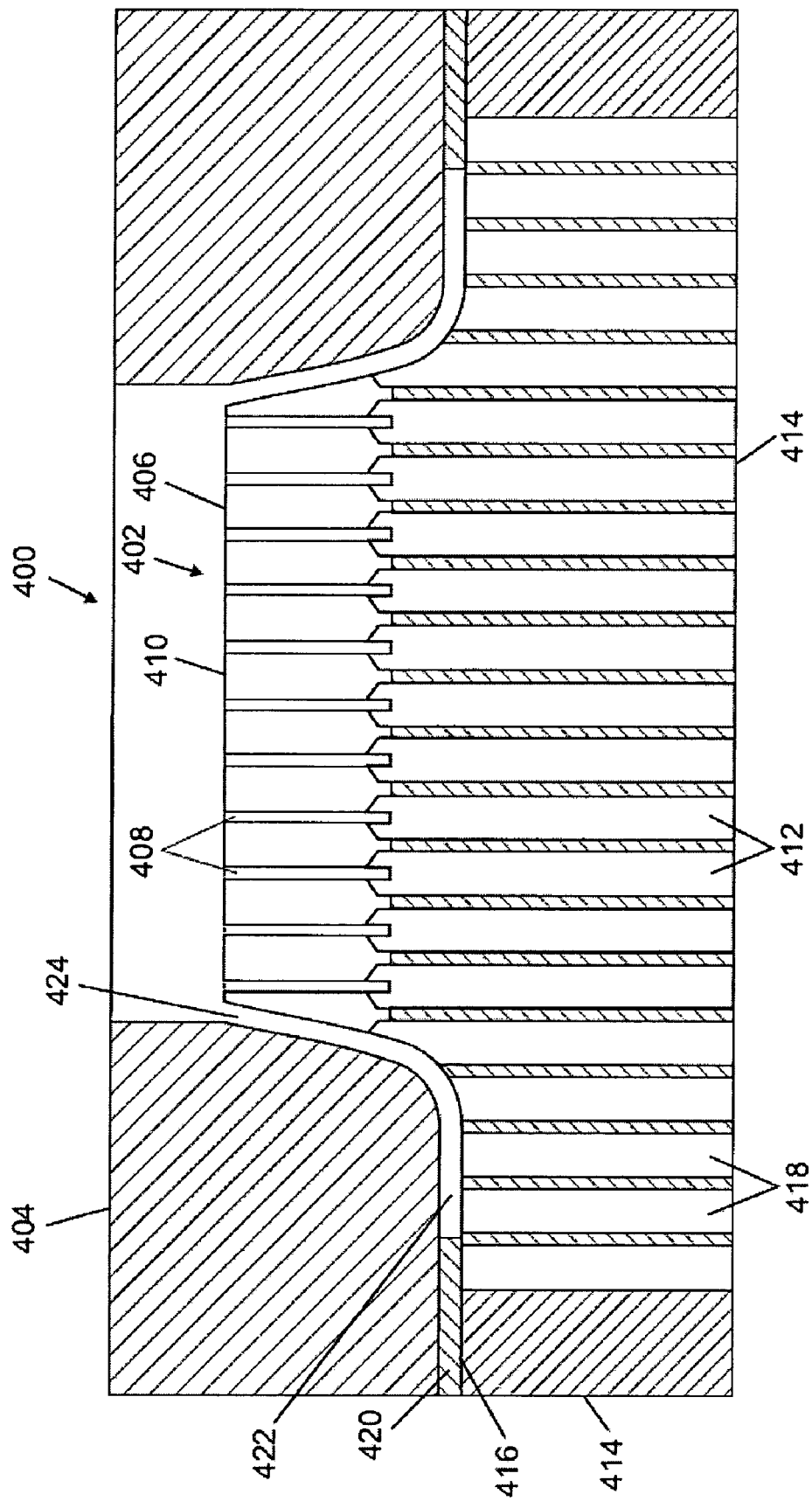
FIG. 4B is a vertical cross-section of the extrusion die assembly of FIG. 4A.

FIG. 4B shows that the central region 406 further includes an array of central feedholes 412 that extend from the inlet face 414 of the cell-forming die 402 to the discharge slots 408. The central feedholes 412 supply batch material to the discharge slots 408. The size and location of the central feedholes 412 relative to the discharge slots 408 are selected to achieve desired rate of flow of batch material through the discharge slots 408. As an example, a central feedhole 412 may correspond to one or more discharge slots 408, or a central feedhole 412 may be positioned at the intersection of one or more discharge slots 408.

The cell-forming die 402 also includes a peripheral region 414 formed contiguous with the central region 406. The peripheral region 414 provides a mounting surface 416 for the skin-forming mask 404 and includes peripheral feedholes 418 for feeding batch material to spaces around the central region 406 of the cell-forming die 402. A shim 420 may be interposed between the mounting surface 416 and the skin-forming mask 404 to define a skin-forming reservoir 422 between the peripheral region 414 and the skin-forming mask 404. The peripheral feedholes 418 in the peripheral region 414 supply batch material to the skin-forming reservoir 422. The skin-forming mask 404 is radially spaced from the central region 406 to define a skin slot 424, which is in communication with the skin-forming reservoir 422. Batch material is extruded through the skin slot 424 to form the skin of the honeycomb filter. The volume of the reservoir 422 can be adjusted to control the rate at which batch material is supplied into the skin slot 424.

In operation, batch material is fed into the central and peripheral feedholes 412, 418 and extruded through the discharge slots 408 and the skin-forming slot 424. The batch material typically includes ceramic materials, carbonaceous materials, and moisture. The carbonaceous materials are typically extrusion and forming aids, such as organic binders, plasticizers, and lubricants, and pore formers. The volume of the batch material in the skin-forming reservoir 422 depends on the extent of the radial overhang of the skin-forming mask 404 over the skin-forming reservoir 422. The rate of flow of batch material into the skin-forming slot 424 affects the character of the skin of the honeycomb filter, while the rate of flow of batch material into the discharge slots 408 affects the character of the walls defining the channels of the honeycomb filter. After extrusion, the extruded body is dried and fired to form a ceramic cellular body having a high mechanical strength.

The extrusion die assembly 400 described above can be manufactured using existing methods of making extrusion dies. The cell-forming die 402 may be made by machining holes in a lower portion of a block that is made of a machinable material. These holes would serve as the central and peripheral feedholes 412, 418. A process such as plunge electrical discharge machining can be used to cut the discharge slots 408 in the upper portion of the block. Pins 410 remain on the upper portion of the block after the discharge slots are cut. The pins at the periphery of the block can be shortened or completely removed to provide the mounting surface 416 for the skin-forming mask 404. The pins 410 could have any of the geometries described above in conjunction with the cell structure of the wall-flow honeycomb filter having a hexagonal channel symmetry.

The wall-flow honeycomb filter having a hexagonal channel symmetry as described above allows for a more compliant structure compared to conventional wall-flow filter design based on a square cell geometry. It is expected that the hexagonal channel symmetry would provide an increased resistance to thermal shock by reducing thermal stress. Further, axial crack propagation along the filter is made more difficult due to lack of continuous walls running across the face of the honeycomb filter. The wall-flow honeycomb filter of the invention based on hexagonal channel symmetry is not to be confused with a cell structure based entirely on hexagonal cells, which has a three-fold symmetry. The wall-flow honeycomb filter of the invention does not have the high pressure drop disadvantage associated with a cell structure based entirely on hexagonal cells.

The cell structure of the wall-flow honeycomb filter having a hexagonal symmetry as described above allows for variation of inlet to outlet channel cross-sectional area over a range of 1:1 to 2:1. The walls of the inlet channels can be used as filtration surfaces by bordering outlet channels, thereby maximizing filtration area. The hydraulic diameter of the larger inlet channels can be made larger than that of a standard square channel for the same cell density, web thickness, and open frontal area. This has an advantage of increasing the effective surface area available for collecting soot and ash in the inlet portion of the honeycomb filter, which ultimately increases the overall storage capacity of the honeycomb filter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wall-flow honeycomb filter, comprising:
a monolith body comprising repeating hexagonal unit cells, each hexagonal unit cell having inner cells and outer cells arranged in a hexagonal symmetry, wherein the inner cells are bordered by the outer cells and the outer cells have a diamond shape,
the unit cell further comprising a center cell bordered on all sides by the inner cells, and wherein
a portion of the cells are inlet channels end-plugged with a filler material at an outlet end face of the filter and another portion of the cells are outlet channels end-plugged with a filler material at an inlet face of the filter.

2. The wall-flow honeycomb filter of claim 1, wherein the inner cells form outlet channels within the monolith body and the center and outer cells form inlet channels within the monolith body.

3. The wall-flow honeycomb filter of claim 1, wherein the center cell has a hexagon shape.

4. The wall-flow honeycomb filter of claim 3, wherein the inner cells have a partial-diamond shape.

5. The wall-flow honeycomb filter of claim 4, wherein the partial-diamond shape is selected from the group consisting of a pentagon and a triangle.

6. The wall-flow honeycomb filter of claim 1, wherein a ratio of the combined cross-sectional area of the center and outer cells to the combined cross-sectional area of the inner cells is approximately 2:1.

7. The wall-flow honeycomb filter of claim 1, wherein a ratio of the combined cross-sectional area of the center and outer cells to the combined cross-sectional area of the inner cells is in a range from approximately 1:2 to 2:1.

8. The wall-flow honeycomb filter of claim 1, wherein a ratio of the combined cross-sectional area of the center and outer cells to the combined cross-sectional area of the inner cells is in a range from approximately 1:1 to 2:1.

9. The wall-flow honeycomb filter of claim 1, wherein a ratio of the combined cross-sectional area of the center and outer cells to the combined cross-sectional area of the inner cells is in a range from approximately 1:2 to 2:1.

\* \* \* \* \*